July 2, 1957 L. F. CARTER 2,797,581
GYROSCOPIC INSTRUMENTS
Filed May 25, 1954 3 Sheets-Sheet 2

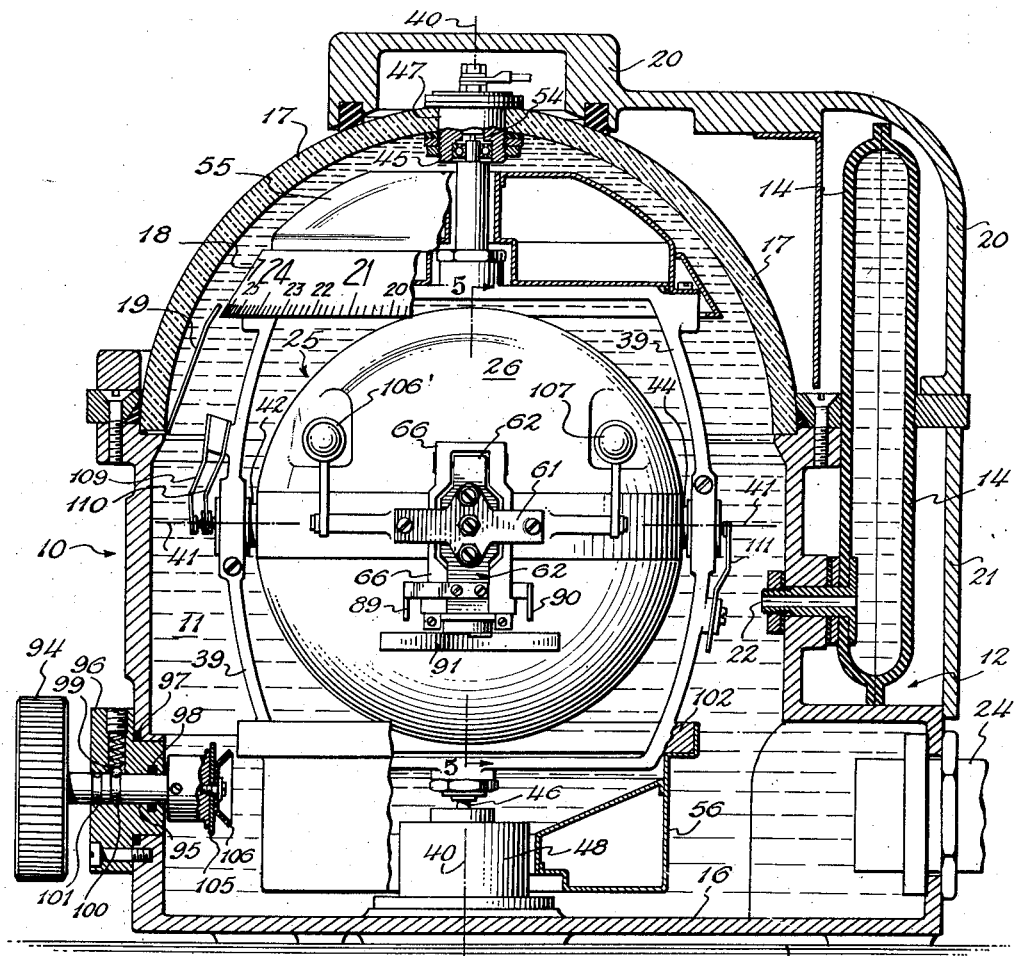

INVENTOR
LESLIE F. CARTER
BY Arthur H. Serrell
ATTORNEY

United States Patent Office 2,797,581
Patented July 2, 1957

2,797,581
GYROSCOPIC INSTRUMENTS

Leslie F. Carter, Leonia, N. J., assignor to Sperry Rand Corporation, a corporation of Delaware Application May 25, 1954, Serial No. 432,193

20 Claims. (Cl. 74—5.5)

This invention pertains to gyroscopic instruments of the miniature, direct reading, gyro compass type. The instrument is particularly designed to be mounted on the instrument panel of relatively small naval craft and land vehicles where severe conditions of service necessitate that the components be of simple, rugged, low cost construction amenable to mass production. The improved miniature gyro compass instrument differs from standard constructional usages in such a device primarily in its size, cost and number of operational components. In particular, there is no follow-up system or ring utilized therein controlled by the gyroscopic meridian directed sensitive element. Also, the customary gimbaled suspension for the gyroscopic element within its binnacle or housing has been eliminated, the sensitive axes being referred to the main housing.

The primary object of the present invention is to provide a small, direct reading, low cost, gyro compass instrument of sufficient accuracy for practical usage on the mobile objects specified that does not require the noted conventional components and that additionally satisfies the above-noted constructional features.

The invention particularly features elimination of the outer gimbal ring system required in standard compasses to provide substantial coincidence between the instrument axes and the control axes; the ballistic and damping force axes.

One of the features of the invention resides in the provision of a float mounting for a gyroscopic element including a gimbal ring interconnecting the binnacle and element having float means connected thereto of external symmetry relative to the major or vertical axis of the element.

Another feature of the invention is provided by the damping torque system for the improved gyro compass including a compound pendulum.

Still a further feature of the invention consists in a resetting and levelling means to directly control the floating meridian seeking element of a gyro compass.

In the improved instrument, the gyroscopic element and ring are buoyantly supported by liquid contained in and completely filling a liquid tight housing or binnacle. Mass movement of the liquid upon turning of the binnacle by the object may result in a torque about the vertical axis of the gyroscopic element. A further feature of the invention is provided by means for counteracting the torque on the element due to such mass movement of the liquid.

Other objects, features and structural details of the invention will be apparent from the following description, when read in relation to the accompanying drawings, wherein:

Fig. 1 is a side elevation view of an instrument embodying the present inventive concepts with the binnacle thereof being shown in vertical section;

Fig. 2 is an enlarged detail vertical section of the journal structure at the bottom of the binnacle of the improved gyro compass;

Fig. 3 is a detail side elevation view of the resetting and levelling means of the instrument with the manually adjustable knob and frictional coupling parts thereof shown in the resetting position;

Fig. 4 is a view similar to Fig. 3, with the knob and coupling parts of the means illustrated in a levelling position;

Figure 6:
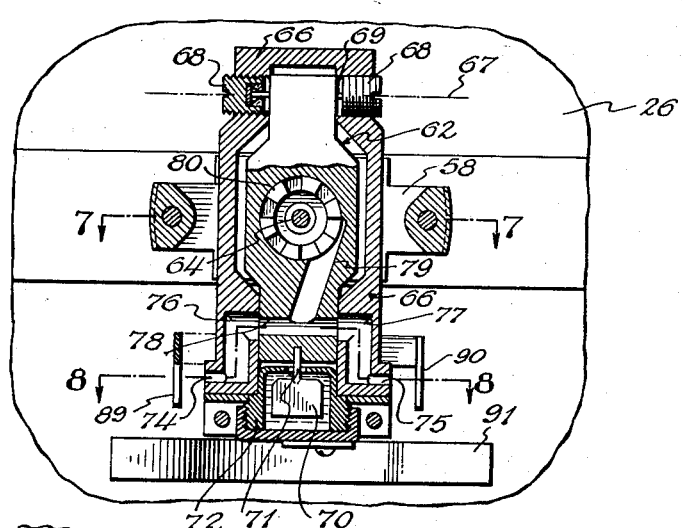
Fig. 6 is a sectional view of the damping means of the instrument taken on lines 6—6, Fig. 5.
Figure 7:
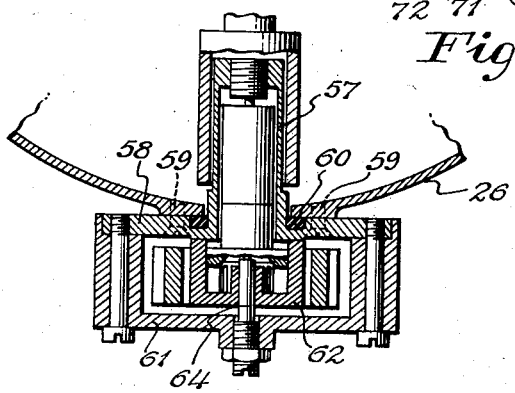
Figure 8:
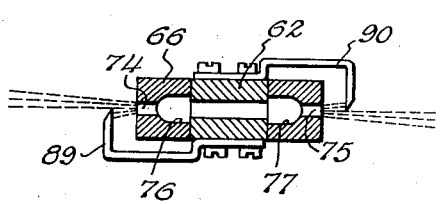
Figure 9:
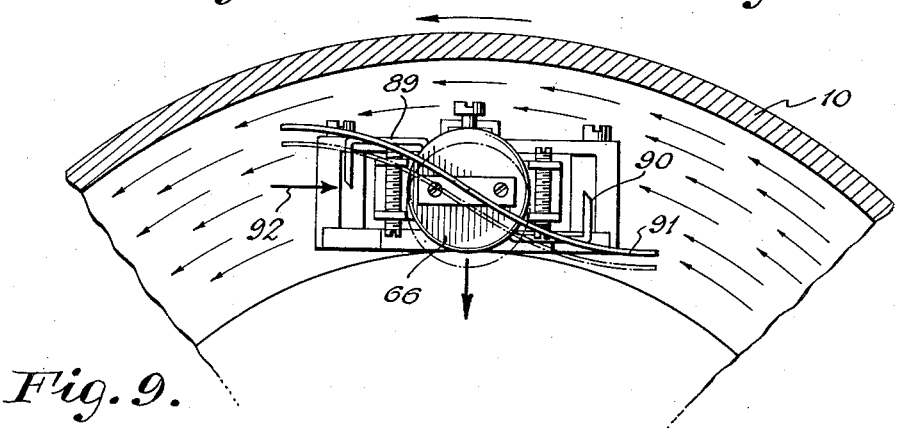

Figs. 7 and 8 are sectional views taken respectively on lines 7—7 and lines 8—8 in Fig. 6; and Fig. 9 is a bottom plan view of the damping means of the improved instrument shown within the binnacle.

With reference to Fig. 1, the housing member for the improved gyro compass is provided by the miniature binnacle 10 which is a liquid tight receptacle with a main compartment 11 in which the operating parts of the instrument are located and an auxiliary compartment 12 containing a diaphragm 14. Binnacle 10 is directly mounted in a suitable manner on the instrument panel 15 of the object, craft or vehicle in which the improved gyro compass is utilized. As illustrated, the portion of the housing member 10 defining the main compartment 11 is provided by a generally cylindrical body having an integral closed end base or bottom wall 16 and a dome shaped cap or cover piece 17 that is mounted on the body with a suitable sealing connection. The cover piece 17 is provided by a curved window constructed of glass or other transparent material through which the compass card 18 of the instrument is observed. The card 18 is readable on a pointer or lubber line defining element 19 that is fixed in relation to the binnacle 10. It is understood that the compass is mounted on the object so that its lubber line or pointer element 19 is located in a vertical plane coincident with or parallel to the fore and aft axis of the object.

The diaphragm chamber 12 of the compass binnacle 10 is situated to the rear of the main compartment 11 being defined by a top plate 20 which engages the crown of the dome-shaped window 17 and a rear plate 21. A tube 22 located in the cylindrical body portion of the binnacle connects the interior of the diaphragm element 14 and the main compartment 11 of the binnacle. The diaphragm 14 and compartment 11 of the binnacle are completely filled by a fluid or liquid such as Varsol or kerosene which provides a medium adapted to float or buoyantly support the operating parts of the instrument as hereinafter described. The diaphragm of the instrument provides a conventional structure that permits expansion or contraction of the liquid within the binnacle due to change of temperature conditions. As the rotor of the instrument is operated by an electric motor, energy of the necessary character is obtained from a suitable source and supplied to a conventional electrical socket 24 also making a liquid tight connection to the rear wall of the body of the binnacle defining the main compartment 11.

The meridian seeking gyroscopic element of the improved gyro compass is generally designated at 25. As shown in detail in Fig. 5, this element is formed of a liquid tight spherical case 26 that is hermetically sealed and substantially evacuated. The rotor 27 is mounted within the case by the suitably spaced bearings 28, 29 to spin about a horizontal North-South directed axis 30. A conventional squirrel cage three phase alternating current motor may be employed to spin the rotor about its axis 30. The fixed windings of such a motor are indicated at 31. The cage element 32 of the motor is suitably fixed to a hub portion of the rotor 27.

Figure 5:
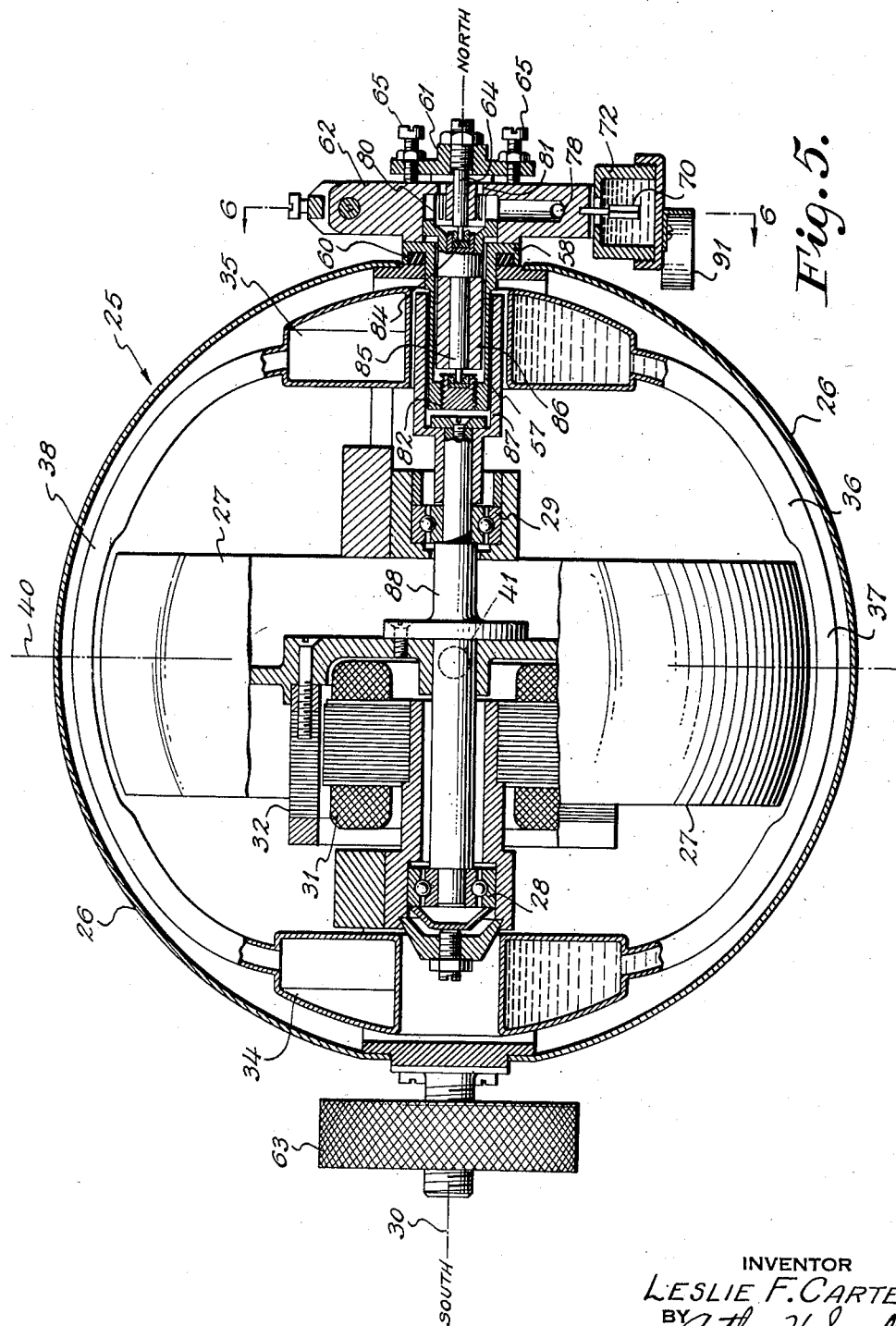
Fig. 5 is an enlarged detail sectional view taken on lines 5—5, Fig. 1 showing the structure of the gyroscopic element apart from the mounting ring and binnacle.

The directivity of the instrument is provided by a liquid type ballistic or means for exerting a meridian seeking torque about the horizontal axis of the element 25. This means may be constituted as shown in Fig. 5 by a pair of toroidal shaped ballistic tanks 34, 35 located within the liquid tight rotor case 25 arranged symmetrically relative to the spin axis 30 of the rotor and equidistantly spaced from the horizontal axis of freedom of the element. The tanks 34, 35 are connected by a liquid containing tube 36 having a central portion of reduced cross-sectional area indicated at 37. The top of the tanks 34, 35 are connected by a breather tube 38 of the same dimensions as the liquid tube 36. The respective tanks 34, 35 are half filled with a liquid of the character such as carbon tetrachloride, the free liquid surface area of the ballistic being designed to provide the torque requirement for an 85 minute period for the gyro compass instrument. The toroidally shaped ballistic tanks provide constant liquid surface area and hence no change in the gyro period when the element 25 is inclined about its east-west axis. The size and weight of the components of the gyroscopic element 25 are designed so as to be substantially equal to the weight of the liquid that it displaces in the binnacle, the liquid providing sufficient buoyancy to float the element in neutral suspension or equilibrium. Due to the spherical exterior surface of the case 26, the element is provided with external symmetry about both vertical and horizontal axes of freedom. The noted liquid is of sufficient density to remove the bearing loads on the vertical and horizontal axes of the element, the center of buoyancy and center of gravity of the element 25 being coincident.

The float mounting for the gyroscopic element 25 is particularly shown in Fig. 1. This mounting, located within compartment 11 of the binnacle, includes a gimbal ring 39 interconnecting the binnacle and rotor case 26 of element 25 with the major axis 40 of the element normally vertical and the minor axis 41 of the element normally horizontal. The east-west horizontal axis of the gyro instrument is provided by axis 41 as defined by the oppositely disposed trunnions 42, 44 extending from the case 26. The load of the weight of the element 25 is removed from the trunnions 42, 44 by the buoyancy of the liquid within compartment 11 of the binnacle so that friction about this axis is reduced to a minimum. The major or azimuth axis of the element 25 is defined by the upper trunnion 45 and lower trunnion 46 on the vertically arranged gimbal ring 39. As shown in Fig. 1, the ring trunnion 45 engages a bearing unit 47 located at the apex of the transparent dome shaped cover 17, the connection between the cover and the unit being liquid tight. The bearing unit 48 for the lower trunnion 46 is located within compartment 11 in the base of the binnacle. As shown in detail in Fig. 2, the base unit 48 includes a liquid tight housing containing a pair of mercury cups 49 and 50 respectively connected to the socket by way of leads 51 and 52. The third lead for energizing the rotor spinning motor of the instrument is connected to the top of the bearing unit 47 as shown in Fig. 1. The conducting sleeve 53 fixed to ring 39 is connected to lead 51 through the conducting fluid in the cup 49. Similarly, the axial spindle 43 fixed to ring 39 is connected to lead 52 through the conducting fluid in cup 50. The conducting spindle for the bearing unit 47 is indicated at 54. The conducting parts of the ring 39 are respectively suitably connected to the brush elements 109, 110 and 111 through leads carried by the ring not shown in the drawing. Suitable conducting parts fixed to the trunnions 42, 44 and element 25 engage the brushes 109, 110 and 111 and supply the required electrical energy to the stator or fixed windings 31 of the motor to spin the rotor 27 of the instrument.

The mounting ring 39 for element 25 also includes float means connected to the ring having external symmetry relative to the major or vertical axis 40 of the element. As shown such float means is formed of two float elements of this character, one of which is connected to the ring 39 above the rotor case 26 as indicated at 55. The other of the float elements 56 is connected to the ring 39 below the rotor case 26. The floats 55, 56 and ring 39 are so designed as to also be substantially equal in weight to the weight of the liquid displaced by the same, the liquid providing sufficient buoyancy to float the rings and the parts connected thereto in compartment 11 of the binnacle in neutral suspension. Thrust bearings are provided at the top and bottom of the ring to limit the relative movement between the ring and binnacle or housing. The ring 39, the ring float means provided by floats 55, 56 and the floatable rotor case are immersed in the liquid within the binnacle in a buoyant condition. The floats 55 and 56 are suitable, air filled, liquid tight, tanks that are fixedly connected to the ring 39. Due to the floatation of the element 25 and ring 39, there is no load on the trunnions 45 and 46 so that the same operate with friction reduced to a minimum. A further part of the ring 39 is provided by the circular compass card 18 which is fixedly connected thereto adjacent the upper float tank 55 in concentric relation to the vertical or azimuth axis 40 of the instrument. In the direct reading type of instrument provided, the card 18 remains relatively fixed in space under control of the gyroscopic element 25 while the binnacle 10 with the fixed pointer 19 thereon moves with the object as it changes heading. The instantaneous course of the object is read by observing the position of the pointer or line 19 on the compass card 18.

In operation of the instrument as a gyro compass, the described ballistic functions to exert a torque about the axis 41 of element 25 to thusly maintain the directivity of the instrument with the rotor spin axis 30 on the meridian or positioned horizontally in a North-South direction. As the miniature gyro compass does not have a followup system from which damping energy can be derived, a damping means independent of such a system is provided. Damping of the compass oscillations about the meridian is accomplished in the improved instrument by a fluid or liquid jet reaction means that provides a torque about the vertical axis 40 of the gyroscopic element 25 in proportion to the tilt of the element from a level condition about the horizontal axis 41. Axis 41 is the normally horizontal East-West directed axis of the improved gyro compass.

The damping means of the instrument is particularly shown in Figs. 1, 5, 6, 7 and 8. The means shown for exerting a torque about the vertical axis of the element 25 includes a compound pendulum located on the northerly disposed side of the case 26. As particularly shown in Figs. 5 and 7, the structure includes a cup-shaped, non-magnetic, mounting piece 57 for the pendulums having an external flange 58 secured to the case 26 by means of screws 59 or other suitable means. A packing gland 60 is located between these parts to insure the tightness of the seal of the gyroscopic element 25 at this point. The portion of the cup piece extending within the case 26 defines an axis that is coincident with the spin axis of the rotor 27 of the element 25. The mounting structure illustrated includes a bracket 61 that is connected in a suitable fixed manner to the external flange 58 of the cup-shaped piece 57. The axis of the first pendulous member 62 is provided by a stub shaft 64 fixed to the bracket 61 so that the axis is coincident with the axis of the rotor 27 of the element 25. As shown, member 62 is secured against axial movement by a pair of screws 65 that are adjusted so the pendulous member loosely contacts the outer surface of the flange portion 58 of the cup-shaped piece 57. Consequently, member 62 of the compound pendulum is mounted on the gyroscopic element 25 with freedom about a horizontal axis normal to the horizontal east-west axis 41 of the element. The axis of freedom of member 62 carried by the element 25 corresponds with the rotor spin axis or the north-south horizontal axis of the gyro compass. To provide for a torque about the vertical, the member 62 is located in a radially displaced position from the vertical axis 40 of the instrument.

The second of the pendulous members of the compound pendulum is indicated at 66. Member 66 is mounted on the first pendulous member 62 with freedom about a horizontal axis 67, Fig. 6, that is parallel to the horizontal east-west axis 41 of the element 26. As shown in Fig. 6, the pivot connection between the noted parts includes a pair of spaced bearings 68 located on the member 66 and a cooperating stub shaft 69 situated on the member 62. Relative motion between the respective members 62 and 66 of the compound pendulum is damped by means of a paddle 70 mounted on an arm 71 extending from the bottom of member 62 and a liquid containing cup part 72 that is suitably connected to the base of the pendulous member 66. The liquid contained in the cup part 72 may be silicon which provides a suitable damping fluid that is non-miscible with the Varsol or kerosene contained in compartment 11 of the binnacle.

Pendulous member 66 of the damping means includes a pair of oppositely directed ports 74, 75 as particularly shown in Figs. 6 and 8. The member 66 also contains channels 76, 77 leading to the respective ports 74, 75. Communicating with the channels 76, 77 in member 66 is a channel 78 in the pendulous member 62 which supplies fluid or liquid to both ports 74, 75 from the outlet channel 79 of fluid or liquid flow providing means constituted by a pump or centrifugal impeller 80 shown in Figs. 6 and 7. The fluid or Varsol liquid input for the impeller 80 is obtained from the compartment 11 of the binnacle by way of the intake passageways 81 in member 62 shown only in Fig. 5. The toothed impeller 80 is rotatably mounted within member 62 for continuous unidirectional motion about the axis defined by the stub shaft 64 by means of the spaced jewel type bearings 82, 84. The drive shaft 85 of the impeller 80 extends within cup shaped mounting piece 57 and includes thereon a magnetized cylindrical part indicated at 86. Part 86 provides one element of a magnetic coupling between the impeller 80 and the rotor 27 of gyroscopic element 25. The other element of the coupling is provided by a soft iron sleeve 87 that extends over the non-magnetic mounting piece 57 and is suitably fixed to an extension of the gyroscopic rotor shaft 88 driven by the rotor spinning motor hereinbefore described. With the instrument in operation and the rotor 27 spinning, the magnetically coupled sleeve 87 and cylindrical magnet part 86 drive the impeller 80. Mounting piece 57 provides a fluid or liquid tight seal between the respective coupling parts through which the centrifugal impeller is driven. Fluid or liquid from compartment 11 continuously enters the centrifugal impeller through passageways 81 and is discharged therefrom under pressure to channel 79 from which it flows into the channel 78, channels 76, 77 and the respective ports 74, 75. The fluid or liquid exhausts from the ports 74, 75 in the form of oppositely direct jets as clearly indicated in Fig. 8 within the compartment 11 of the gyro compass binnacle.

As shown, the first pendulous member 62 includes baffle means for differentially intercepting the jets issuing from the ports 74, 75 in the form of knife edged plates 89, 90 connected to the member as shown in Fig. 8. This figure shows each of the baffles intercepting equal amounts of the jets which depicts a level condition of element 25 about the horizontal axis 41 and a balanced condition for the damping torquing means. With tilt about axis 41 and resultant relative movement of the members 62, 66 about axis 67, the damping means departs from a balanced condition with the baffle means intercepting more of one of the jets and less of the other of the jets from the respective ports. A resultant reactive torque is consequently exerted about the vertical axis of the element 25 to damp its oscillations to either side of the meridian.

The reactive jet force about the axis is proportional to the tilt about the east-west axis of the gyro compass. In the instrument, the axis about which the damping means is effective remains normal to the true horizontal by reason of the freedom of the compound pendulum about the north-south horizontal axis as well as the horizontal east-west axis. Hence, the axis about which the damping torque is exerted remains truly vertical even with tilt of the instrument in an east-west plane and inclination of the ring 39 from a vertical position.

The improved gyro compass also includes means for exerting a liquid jet reaction torque about the azimuth axis of the element 25 to counteract the torque on the element due to movement of the liquid within the compartment 11 upon turning of the vehicle. This effect is known as liquid "windup" and is encountered only when the liquid has been set in motion by the turning of the vehicle carrying the instrument in a uniform direction over a relatively long time period. The means is provided by the heretofore described jets of the damping torque means together with a second baffle means constituted by a curved plate 91 particularly shown in Figs. 6 and 9 that is suitably connected to the bottom of the pendulous member 66 in a position to be influenced by the motion of the liquid within the binnacle. With reference to Fig. 9 of the drawing, the liquid is indicated as moving in a counterclockwise direction in compartment 11 of the binnacle to urge the plate 91 from its full line position to its dotted line position. Such response of the plate 91 of the baffle means to the liquid results in corresponding motion of the pendulous member 66 so that baffle plate 89 intercepts less than half of the jet issuing from port 74. The reactive torque of the counteracting means represented by the directed arrow 92, Fig. 9, opposes or counteracts the torque on the gyroscopic element due to the motion of the liquid. With continued motion of the binnacle 10 and the liquid in a reverse direction, the counteracting means operates so that the jet reaction from port 75 is rendered effective to exert the necessary counteracting torque.

As shown in Fig. 5, a counterbalancing mass 63 of approximately the same volumetric displacement as the described torquing means is suitably mounted on the south end of the gyroscopic element 25.

The improved gyro compass also includes a means for resetting the gyroscopic element 25 about its azimuth axis 40 and for levelling the element about its horizontal axis 41. Such means as particularly shown in Figs. 1, 3 and 4, includes a manual adjustable knob 94 located exteriorly of the binnacle 10 whose manipulation by a human operator is effective to accomplish both of the noted results. As shown, knob 94 is located at the front of the instrument on a shaft 95 extending through a cylindrical fitting 96 mounted in the front wall of the binnacle that is sealed by a packing ring 97 to provide a liquid tight connection. The knob 94 is rotatable as well as axially movable in the fitting 96, the connection between the parts including a further packing 98 that prevents loss of liquid along the shaft 95. Axial movement of the shaft 95 is limited by a spring pressed detent or ball 99 carried by the fitting 96, that cooperates with inner and outer grooves made in the shaft 95 as respectively designated at 100 and 101. With detent 99 engaged in groove 100 as shown in Fig. 1, the resetting and levelling means is rendered ineffective inasmuch as there is no frictional coupling between the ring 39 and knob 94 with the parts so positioned. As shown, the means includes two contacting parts within the binnacle 10 providing a close frictional coupling between the knob and ring for resetting the element 25 and a loose frictional coupling between the same members for leveling the element 25. The parts include a circular rim 102 formed as a portion of the ring 39 to which the lower float 56 is attached by a flange. The outer surface of the flange of float 56 is contactable by a variable friction member consisting, as shown, of a washer mounting element 104 suitably secured to the inwardly extending end of the shaft 95. A straight and a curved washer as indicated at 105, 106 respectively, are suitably fixed to the end of element 104 in a position to contact the surface of the flange of the float in any azimuthal position of the binnacle. With the knob 94 in its in position as shown in Fig. 3, with detent 99 engaging groove 101, the curved washer 106 is pressed flat and the contacting parts provide a close frictional coupling between knob 94 and ring 39. With this coupling of the parts, the freedom of the element 25 about axis 40 is lost. Any rotation of the knob 94 in this position results in a corresponding movement of the ring 39 so that the card 18 may be initially set as desired in starting the instrument or may be reset during the instrument's operation. With the rotor spinning in element 25 and movement of the ring 39 by the knobs results in immediate tilting of the element about axis 41. The provided means is also effective to level the element 25 about axis 41 regardless of the cause of the tilt. This position of the parts is shown in Fig. 4 where the detent 99 is between the grooves 100 and 101 and only the curved washer 106 contacts the cooperating surface of the float 56. This type of contact between the knob 94 and ring 39 provides a loose frictional coupling that can be adjusted by axial pressure on the knob 94 until the element 25 is level. In making this hand adjustment, the operator observes a liquid level indicating device located on element 25 through the window 17. A plurality of liquid level devices, two of which are indicated at 107 and 106', Fig. 1, are symmetrically arranged on the gyroscopic element 25 for this purpose. One or more of the level devices employed is observable through the window 17 regardless of the azimuthal position of the binnacle.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro compass, a meridian seeking gyroscopic element having a vertical axis and an east-west axis of freedom, fluid jet reaction means for exerting a damping torque about the vertical axis of the element including a compound pendulum having a first pendulous member mounted on said element in a radially displaced position from the vertical axis with freedom about a normally horizontal axis perpendicular to the east-west axis, a second pendulous member mounted on said first member with freedom about a horizontal axis parallel to the east-west axis of the element, a pair of oppositely directed ports in said second pendulous member, a channel in said first pendulous member communicating with the ports of the second pendulous member, means for providing a flow of fluid through the channel and ports of said respective pendulous members, and baffle means carried by said first pendulous member for differentially intercepting the fluid jets issuing from the ports with tilt of the element about its east-west axis.

2. An instrument of the character claimed in claim 1, including a liquid tight housing, second baffle means carried by said second pendulous means, and in which the fluid is a liquid, the gyroscopic element is floated in the liquid filled housing and the baffle means carried by the second pendulous means is responsive to motion of the liquid in the housing caused by turning of the instrument.

3. In a gyroscopic instrument, a gyroscopic element having a vertical axis and a horizontal axis of freedom, means for exerting a fluid jet torque about the vertical axis of the element including a compound pendulum having a first pendulous member mounted on said element in a radially displaced position from the vertical axis with freedom about a normally horizontal axis normal to the horizontal axis of the element, a second pendulous member mounted on said first member with freedom about a horizontal axis parallel to the horizontal axis of the element, a pair of oppositely directed ports in said second pendulous member, a channel in said first pendulous member communicating with the ports of the second pendulous member, means for providing a flow of fluid through the channel and ports of the respective pendulous members, and baffle means carried by said first pendulous member for differentially intercepting the fluid jets issuing from the ports with tilt of the element about its horizontal axis.

4. Means for exerting a jet reaction damping torque about the azimuth axis of the gyroscopic element of a gyro compass including a first pendulous member carried by the gyroscopic element with freedom about a horizontal N.-S. directed axis, a second pendulous member mounted on said first member with freedom about a normally horizontal E.-W. axis, a pair of oppositely directed ports in said second pendulous member, a channel in said first pendulous member communicating with the ports of the second pendulous member, means for providing a flow of fluid through the channel and ports of the respective pendulous members, and baffle means carried by said first pendulous member for differentially intercepting the fluid jets issuing from the ports with tilt of the element about its E.-W. axis.

5. The combination claimed in claim 4, in which said fluid flow providing means includes a centrifugal impeller at the axis of the first pendulous member having an inlet providing channel in the pendulous member, and a magnetic coupling interconnecting the impeller and the gyroscope of the gyroscopic element.

6. In a gyro compass, a liquid filled binnacle, a gyroscopic element having a spinning rotor and a liquid tight rotor case buoyantly supported by the liquid in the binnacle having an azimuth axis and an E.-W. axis of freedom, means for exerting a liquid jet reaction torque about the azimuth axis of the element to counteract the torque on the element due to movement of the liquid upon turning of the binnacle including a first pendulous member carried by the gyroscopic element with freedom about a horizontal N.-S. axis, a second pendulous member mounted on said first member with freedom about a normally horizontal E.-W. axis, a pair of oppositely directed ports in said second pendulous member, a channel in said first pendulous member communicating with the ports of the second pendulous means, means for providing a flow of liquid through the channel and ports of the respective pendulous members, baffle means carried by said first pendulous member for differentially intercepting the liquid jets issuing from the ports, and second baffle means carried by said second pendulous member responsive to movement of the liquid to move the member relatively to the first baffle means and exert the counteracting torque.

7. The combination claimed in claim 6, in which said liquid flow providing means includes a centrifugal impeller at the axis of the first pendulous member magnetically coupled to the rotor of the gyroscopic element having an inlet providing channel in the first pendulous member to the liquid in the binnacle.

8. In a gyro compass, the combination of, a liquid tight binnacle, a gyroscopic element floatably supported by liquid in said binnacle, a vertical ring interconnecting the element and binnacle also floatably supported by the liquid in the binnacle and mounting the element with freedom about an azimuth axis and a horizontal axis, and means for resetting said gyroscopic element about its azimuth axis and for levelling the element about its horizontal axis including a manually adjustable knob located exteriorly of the binnacle and two contacting parts within the binnacle providing a close frictional coupling between the knob and ring for resetting the element and a loose frictional coupling between the knob and ring for levelling the element.

9. A gyro compass as claimed in claim 8, that includes a plurality of symmetrically arranged liquid levels on the gyroscopic element for indicating a level condition thereof about its horizontal axis.

10. In a gyro compass, the combination of a liquid tight binnacle, a gyroscopic element floatably supported by liquid in said binnacle, a float mounting for the element within the binnacle providing freedom for the element about an azimuth and a horizontal axis, and means for resetting said gyroscopic element about its azimuth axis including a manually adjustable knob located exteriorly of the binnacle and two contacting parts within the binnacle providing a close frictional coupling between the knob and float mounting.

11. In a gyro compass, the combination of, a binnacle, a gyroscopic element, a vertical ring mounting the element within the binnacle with freedom about an azimuth and a horizontal axis, and means for levelling the element about its horizontal axis including a manually adjustable knob located exteriorly of the binnacle and two contacting parts within the binnacle providing a loose frictional coupling between the knob and ring.

12. The combination in an instrument of the class described of a gyroscopic element having a spinning rotor and a rotor case, means for mounting the element with freedom about mutually perpendicular major and minor axes, fluid jet reaction means for exerting a torque about one of the axes of the element, and means for providing a flow of fluid for the fluid jet reaction means including a centrifugal impeller having an axis coincident with the spin axis of the rotor, and a magnetic coupling between the impeller and rotor.

13. The combination claimed in claim 12, including a liquid tight binnacle, in which the rotor case is liquid tight and floatable in a liquid substantially filling the binnacle, and in which the fluid of the jet reaction means is the liquid buoyantly supporting the rotor case, said magnetic coupling having a non-magnetic liquid tight seal between the respective parts thereof.

14. A gyro compass instrument comprising a liquid tight binnacle, a gyroscopic element having a spinning rotor and a liquid tight floatable rotor case, a float mounting for the element within the binnacle including a gimbal ring interconnecting the binnacle and rotor case with the major axis of the element normally vertical and the minor axis of the element normally horizontal and float means connected to the ring, means for exerting a meridian seeking torque about the horizontal axis of the element located within the liquid tight rotor case, liquid jet reaction means for exerting a damping torque about the vertical axis of the element including a compound pendulum having a first pendulous member with freedom about an axis normal to the minor axis of the element and a second pendulous member with freedom about an axis parallel to the minor axis of the element, means for resetting and levelling the gyroscopic element including a manually adjustable knob located exteriorly of the liquid tight binnacle, and a liquid contained by and substantially filling the binnacle in which the ring, the ring float means, the gyroscopic element and the pendulous members of the damping means are immersed in a buoyant condition.

15. In a gyroscopic instrument, a gyroscopic element having a spinning rotor and a liquid tight floatable rotor case, a liquid tight housing, a float mounting for the element within the housing including a gimbal ring interconnecting the housing and rotor case with the major axis of the element normally vertical and the minor axis of the element normally horizontal and float means connected to the ring, liquid jet reaction means for exerting a torque about the vertical axis of the element including a compound pendulum having a first pendulous member with freedom about an axis normal to the minor axis of the element and a second pendulous member with freedom about an axis parallel to the minor axis of the element, and a liquid contained by and completely filling the housing in which the ring, the ring float means, the floatable rotor case and the compound pendulum are buoyantly immersed in neutral suspension or equilibrium.

16. In a gyro compass, a meridian seeking element having a spinning rotor and a liquid tight floatable rotor case, a liquid tight housing, a float mounting for the element within the housing including a gimbal ring interconnecting the housing and case with the major axis of the element normally vertical and the minor axis of the element normally horizontal and float means connected to the ring, a liquid contained by and completely filling the housing in which the ring, the ring float means and the floatable rotor case are immersed in a buoyant condition, and means for resetting the meridian seeking element about its normally vertical axis and for levelling the meridian seeking element about its normally horizontal axis having a manually adjustable knob located exteriorly of the liquid tight housing.

17. In a gyro compass, a meridian seeking element having a spinning rotor and a liquid tight floatable rotor case, a liquid tight housing, a float mounting for the element within the housing interconnecting the housing and case with one axis of the element normally vertical and another axis of the element normally horizontal, a liquid contained by and completely filling the housing in which the float mounting and floatable rotor case are immersed in a buoyant condition, and means for resetting the meridian seeking element about its normally vertical axis and for levelling the meridian seeking element about its normally horizontal axis having a manually adjustable knob located exteriorly of the liquid tight housing.

18. In a gyroscopic instrument for ships, a gyroscopic element including a liquid tight rotor case, a liquid tight housing therefor, the case being floated within liquid filling the housing in neutral equilibrium, a gimbal ring within said housing also immersed in said liquid and mounted in vertical guide bearings in said housing and providing horizontal guide bearings for the rotor case, said ring being likewise supported in said liquid in neutral equilibrium about both axes, and means for exerting a torque about the vertical axis of said element upon turn of the ship to counteract the drag of said liquid on said element and ring caused by the turning of said housing with the ship.

19. A gyroscopic instrument as claimed in claim 15, in which said liquid jet reaction damping means is provided with means to reduce the swirl effect of the liquid on the element set up by turn of the ship.

20. In a gyroscopic instrument for ships, a gyroscopic element including a liquid tight rotor case, a liquid tight housing therefor, the case being floated within liquid filling the housing in neutral equilibrium, a gimbal ring within said housing also immersed in said liquid and mounted in vertical guide bearings in said housing and providing horizontal guide bearings for the rotor case, said ring being likewise supported in said liquid in neutral equilibrium about both axes, and means for minimizing the effect on the case of swirl of the liquid in the housing due to motions of the ship.

References Cited in the file of this patent

UNITED STATES PATENTS

| | | |
|---|---|---|
| 38,125 | Ritchie | Apr. 7, 1863 |
| 794,654 | Anschutz-Kaempfe | July 11, 1905 |
| 1,773,172 | Davis | Aug. 19, 1930 |
| 1,987,383 | White | Jan. 8, 1935 |
| 2,001,038 | Reid | May 14, 1935 |
| 2,008,481 | Weber et al. | July 16, 1935 |
| 2,200,976 | Bates | May 14, 1940 |
| 2,677,194 | Bishop | May 4, 1954 |